United States Patent [19]

Huang et al.

[11] Patent Number: 5,216,946
[45] Date of Patent: Jun. 8, 1993

[54] PRECOOKED FILLED PASTA PRODUCTS MADE BY CO-EXTRUSION

[75] Inventors: David P. Huang, Boundbrook; Thomas Merolla, Millburn, both of N.J.

[73] Assignee: CPC International Inc., Englewood Cliffs, N.J.

[21] Appl. No.: 789,067

[22] Filed: Nov. 7, 1991

Related U.S. Application Data

[63] Continuation-in-part of Ser. No. 198,897, May 26, 1988.

[51] Int. Cl.[5] .................. A21C 9/00; A21C 9/06; A21C 11/00; A23P 1/00
[52] U.S. Cl. ......................... 99/353; 99/355; 99/357; 99/450.6; 99/450.7; 99/483; 99/484; 425/133.1; 425/308
[58] Field of Search .............. 99/352, 353, 355, 450.1, 99/450.2, 450.6, 450.7, 483, 494, 403-407; 425/112, 131.1, 133.1, 307, 308; 426/283, 523, 503

[56] References Cited

U.S. PATENT DOCUMENTS

| 2,227,728 | 1/1941 | Lombi . | |
|---|---|---|---|
| 2,774,313 | 12/1956 | Lombi . | |
| 3,566,805 | 3/1971 | Meyer | 99/450.6 |
| 3,605,641 | 9/1971 | Shuster . | |
| 3,846,568 | 11/1974 | Cunningham . | |
| 4,160,634 | 7/1979 | Huang | 425/112 |
| 4,243,690 | 1/1981 | Murakami et al. | 426/557 |
| 4,251,201 | 2/1981 | Krysiak | 425/132 |
| 4,251,549 | 2/1981 | Fournet et al. | 99/450.1 |
| 4,382,768 | 5/1983 | Lifshitz et al. | 425/306 |
| 4,394,397 | 7/1983 | Lometillo et al. | 426/557 |
| 4,473,593 | 9/1984 | Sturgeon | 426/461 |
| 4,495,214 | 1/1985 | Seltzer et al. | 426/557 |
| 4,521,436 | 6/1985 | Lou et al. . | |
| 4,540,592 | 9/1985 | Myer et al. | 426/557 |
| 4,574,690 | 3/1986 | Chiao et al. | 99/353 |
| 4,579,744 | 4/1986 | Thulin et al. | 426/283 |
| 4,618,499 | 10/1986 | Wainwright | 426/283 |
| 4,630,533 | 12/1986 | Schaaf et al. | 99/353 |
| 4,636,158 | 1/1987 | Huang | 425/133.1 |
| 4,648,821 | 3/1987 | Thulin | 426/283 |
| 4,699,047 | 10/1987 | Lee et al. | 425/131.1 |
| 4,769,251 | 9/1988 | Wenger et al. | 426/459 |
| 4,786,243 | 11/1988 | Kehoe | 425/131.1 |
| 4,828,863 | 5/1989 | Aoki | 426/512 |
| 4,859,479 | 8/1989 | Hayashi et al. | 99/450.7 |
| 4,941,402 | 7/1990 | D'Alterio | 99/450 |
| 4,996,914 | 3/1991 | D'Alterio | 99/450.6 |

Primary Examiner—Timothy F. Simone
Attorney, Agent, or Firm—Brooks Haidt Haffner & Delahunty

[57] ABSTRACT

A method and apparatus for preparing quick cooking and precooked filled pasta products by preconditioning a blend of a starch material with steam and small amounts of an internal lubricant to produce a semi-moist and partially cooked blend which is cooked and cooled under controlled conditions in a co-rotating twin screw extruder with low shear screw configuration and then co-extruded into the final filled pasta product by extruding the blend through a die, and cutting the extrudate, which may then be dried or otherwise processed.

20 Claims, 5 Drawing Sheets

PASTA MICROSTRUCTURE
200 X

IMPROVED EXTRUSION

PASTA MICROSTRUCTURE
200 X

CONVENTIONAL STEAM

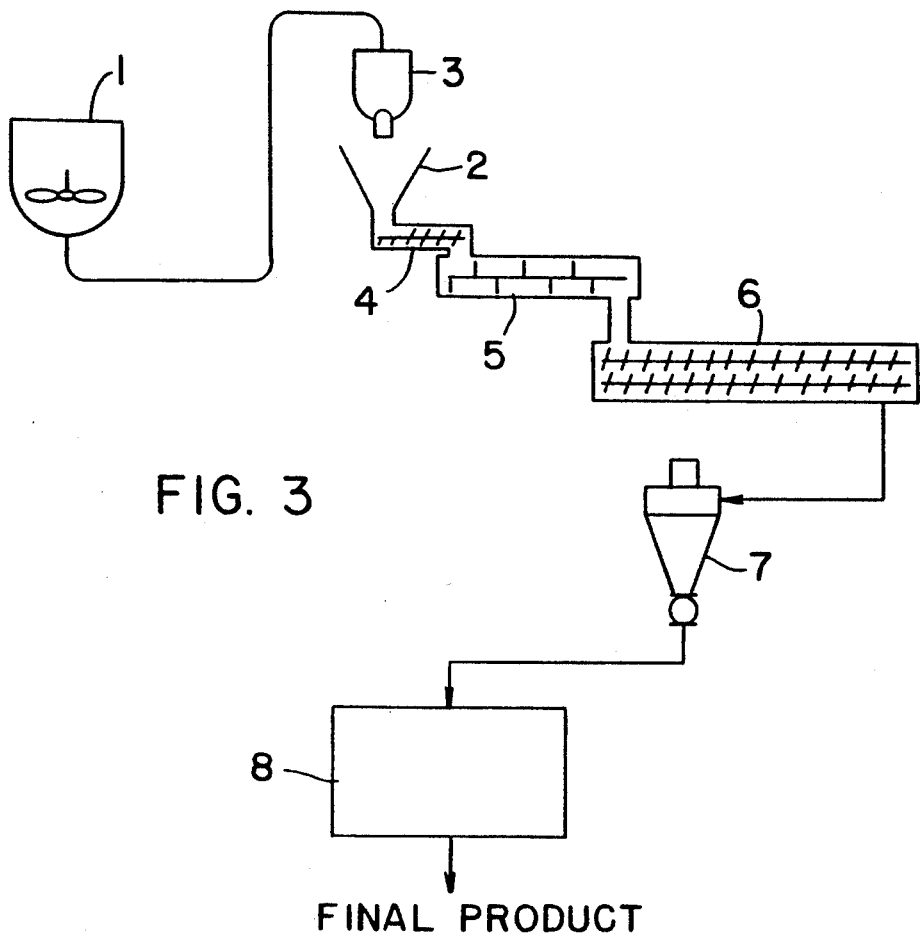
FIG. 3
FINAL PRODUCT
FIG. 4
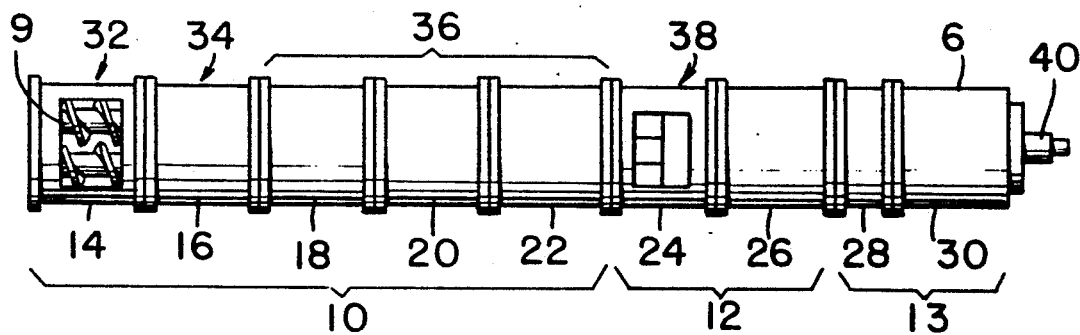

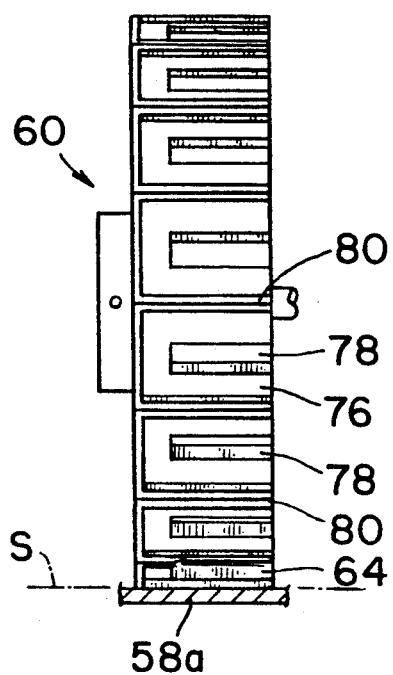
FIG. 11
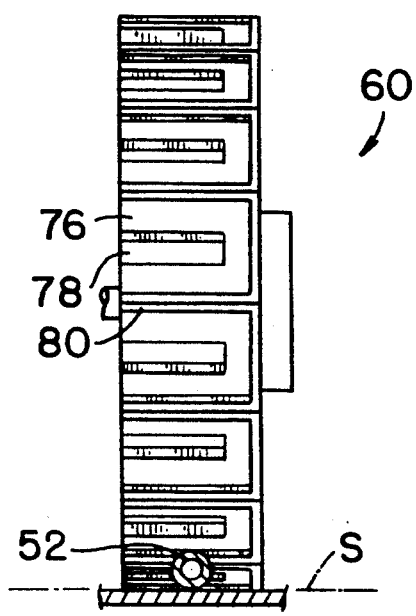
FIG. 12
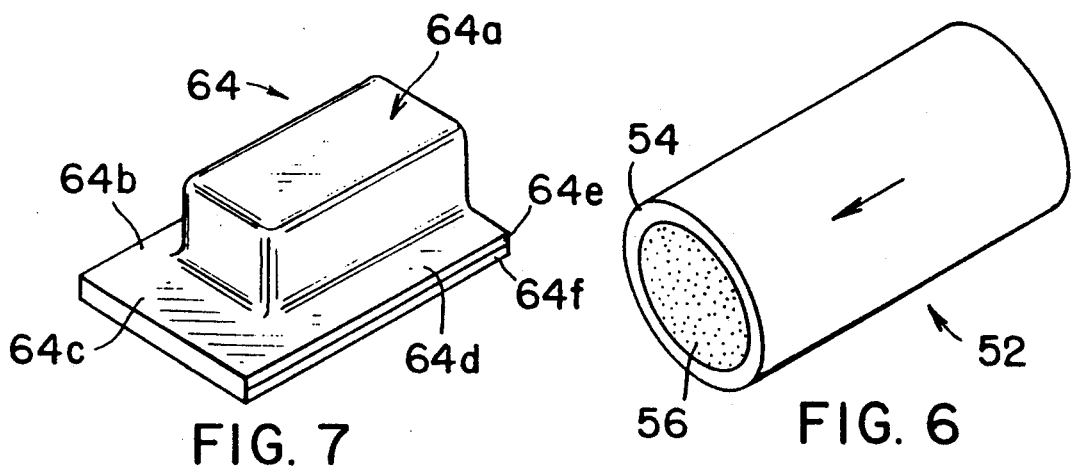
FIG. 7
FIG. 6
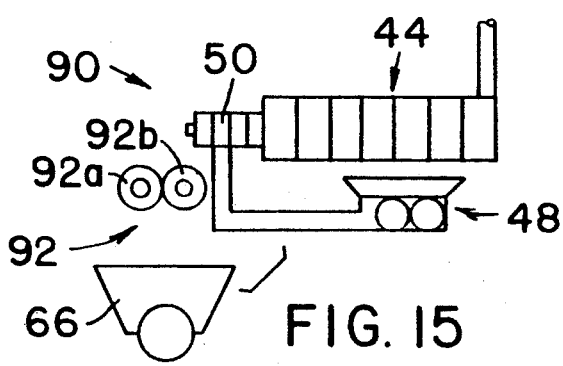
FIG. 15
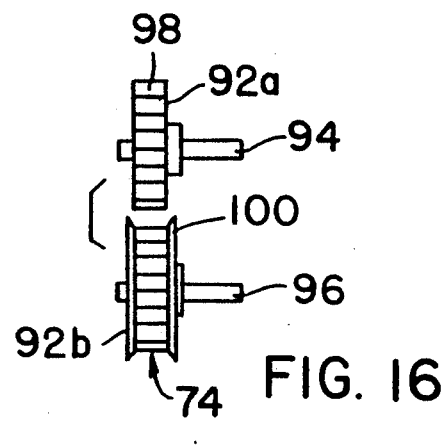
FIG. 16

PRECOOKED FILLED PASTA PRODUCTS MADE BY CO-EXTRUSION

CROSS REFERENCE TO RELATED APPLICATIONS

This is a continuation-in-part of Ser. No. 07/198,897 filed May 26, 1988.

BACKGROUND OF THE INVENTION

1. Field Of The Invention

This invention relates to a method and apparatus for preparing a variety of quick cooking and precooked filled pasta products, such as ravioli, tortellini, manicotti, stuffed shells, dumplings and wonton by utilizing a steam injected preconditioner with an internal lubricant, a co-rotating intermesh twin screw extruder with low shear configuration and a co-extrusion die, and a stamper or cutter for forming a continuous co-extruded filled shell into pasta segments of predetermined configuration.

2. Description Of The Related Art

The use of co-extrusion equipment and processes to prepare filled food products is known. U.S. Pat. No. 4,574,690 to Chiao et al., for example, describes an apparatus and process for continuously producing a co-extruded wrapped food product such as wonton, pot stickers, ravioli, tamalis, filled donuts and the like. After the product is filled, shaped, cut and sealed, it is partially or completely cooked, or frozen. Other co-extrusion apparatus and processes are disclosed in U.S. Pat. No. 4,579,744 to Thulin et al. and U.S. Pat. No. 4,618,499 to Wainright.

In recent years, there has been a substantially increased demand for foods which can be prepared quickly. While pasta products, including filled pasta products, which are pre-cooked are very popular with consumers, conventional pasta products require anywhere from 5 minutes to an hour to cook. This is the time required for boiling water to rehydrate and gelatinize the starch contained in these products, which is necessary to make them suitable for consumption. To adapt such products to more convenient and quick cooking food items, many attempts have been made in the art to reduce necessary cooking time.

Methods and apparatus for preparing a pre-cooked pasta product are disclosed in U.S. Pat. No. 4,540,592 to Myer et al. High temperature pumping and back mixing zones are utilized to form a gelatinized pasta dough by uniformly mixing a cereal composition and blending it with water. The dough is subjected to shearing conditions at elevated pressures and temperatures substantially above the gelatinization temperatures of the starches in the cereal composition.

In Seltzer et al., U.S. Pat. No. 4,495,214, a process is disclosed for the production of quick cooking pasta products. The process comprises combining flour, water, a carbonate, acidic leavening salt and an interrupter to form a dough, extruding the dough through an extrusion cooker under conditions of pressure and temperature sufficient to permit the carbonate to react with the acidic leavening salt and at least partially to gelatinize the starch in the flour, and drying the extruded, formed pasta product.

In U.S. Pat. No. 4,243,690, Murakami et al. disclose a process for preparing instant cooking dry macaroni. The flour and other ingredients are mixed with 25 to 35% weight water into a granular mixture while avoiding kneading The mixture is then subjected to a preliminary steaming step to effect alpha-conversion of the starch components. Thereafter the mixture is molded into the desired shape, and then subjected to an additional steaming step, followed by drying.

Lometillo et al., in U.S. Pat. No. 4,394,397, disclose a process for producing instant pasta products having an expanded porous cellular structure which enables the pasta to be rehydrated for consumption in a short period of time. The pasta blend comprises a farinaceous starch-containing material, gluten, an edible vegetable oil, a strengthening agent, such as microcrystalline cellulose, and water, all of which are introduced into an extrusion cooker. Optional ingredients include a starch complexing agent, such as glyceryl monostearate, a phosphatide such as lecithin, cereal flour, flavoring and vitamins.

U.S. Pat. No. 4,473,593 to Sturgeon discloses a process for preparing quick cooking food including rice, cereal, grain or pasta, wherein the particulate food product is fluidized with steam to a predetermined moisture level, and subsequently cooled and dried to a second predetermined moisture level, also in a fluidized bed.

Harada et al. U.S. Pat. No, 4,540,590, discloses a process for producing a partially dried pasta with good shelf life, while Cunningham, in U.S. Pat. No. 3,846,563 discloses quick cooking macaroni products. They are produced by forming a dough containing at least 50% wheat flour, which is then formed into noodles by extrusion and the noodles re-dried to a moisture content of less than 6%.

The use of a lubricant in the formulation of reformed, rehydratable rice products is disclosed in U.S. Pat. No. 4,521,436 to Lou et al. Starting materials used in the process include ungelatinized rice flour, an aeratron agent, an emulsifier and optionally an edible gum.

An extrusion process for manufacturing quick cooking rice is disclosed in U.S. Pat. No. 4,769,251 issued to Wenger et al. This patent disclosed a low shear extrusion process in which a mixture of ingredients is mixed in a preconditioner, and thereafter the mixture is introduced into an extruder and passes through a cooking zone. The cooked mixture then passes through a venting zone and out through an extruded dye to form the final product.

A number of machines have been proposed for the automated production of pasta products, including those which encapsulate a filler material with dough. Typical machines of this type are disclosed in U.S. Pat. Nos. 2,227,728 and 2,774,313 to Lombi; U.S. Pat. No. 3,605,641 to Shuster; U.S. Pat. No. 4,160,634 to Huang; 4,941,402 and U.S. Pat. No. 4,996,914 to D'Alterio Although these machines exhibit slight variations, they typically include separate hoppers for a fresh dough mixture and a separate source for filler material Each of the hoppers releases the dough mixture which is flattened into dough sheets by passage through various forming and shaping rollers. The filler material is deposited between the two sheets of fresh dough and a ravioli or dumpling type product is formed by the pressing and cutting of the two fresh sheets of dough about peripheral portions which surround the central filled region of the product. In the D'Alterio, U.S. Pat. No. 4,996,914, one sheet of fresh dough is deposited on a rotary horizontal drum with uniformly spaced cavities A filler dispenser has downwardly aimed nozzles which inject filler material into the cavities after the first sheet of fresh dough has been forced into the cavity. A second sheet of fresh dough is laid over the cavity and a roller presses the second sheet against the first sheet to fuse them around the central filled portion. The dough encapsulated pasta sections are cut from the fused dough sheets as ravioli or like product.

None of the apparatus disclosed in the aforementioned patents form filler encapsulated pasta products, such as ravioli, from a precooked cylindrical pasta shell formed in a co-extruder.

The present invention provides flexibility in processing quick cooking or precooked, filled pasta products. A variety of filled pasta products are provided with various degrees of cooking time. The products can be produced quickly and economically by using a twin screw extruder in conjunction with a preconditioner, an internal lubricant, a co-extrusion die, and a stamper or cutter for forming a continuous co-extruded shell into pasta segments of predetermined configuration.

SUMMARY OF THE INVENTION

Quick cooking or precooked filled pasta products are manufactured by introducing a filling food component into a coextrusion die at the exit port of a pasta extruder. The filling food component can be preconditioned if necessary so that it can be cooked as part of a filled pasta product in the same time in which the pasta is cooked.

The pasta component is prepared by preconditioning a blend of a starch material, such as flour with steam and with small amounts of an internal lubricant to produce a semi-moist, semi-cooked blend. The semi-cooked blend is then passed through a fully-intermeshed, co-rotating, twin-screw cooker extruder having a low shear screw configuration setting and is then extruded through a co-extrusion die. The co-extrusion die is configured so that a continuous tube of the pasta component blend is formed as the outer material. The filling food component is pumped into the co-extrusion die upstream of the exit port so that the continuous tube of pasta is already filled with the filling food component as it exits the co-extrusion die, thus producing a continuously filled product. The extrudate is shaped and cut to form the filled pasta product, which can be dried, without further processing.

The filled pasta products of the invention are extruded at elevated temperature conditions and, therefore, a pasteurization process is not needed for postextrusion. This is a significant improvement over currently employed technology which produces uncooked products. The production rate is much faster than that of currently employed technology and there is no need to purchase specially designed equipment for producing different kinds of filled pasta products Finished product texture can be controlled to specific design points by selecting processing conditions.

An apparatus for producing the pre-cooked pasta products comprises extruding means which extrudes an elongate pre-cooked cylindrical pasta shell which contains pre-cooked filler material. The co-extruded pasta shell is advanced from the extruding means along a predetermined path. Stamping means are provided for partitioning the cylindrical pasta shell into pasta segments each having axial ends and shaping each segment to have a predetermined configuration and sealing the axial ends to capture and retain the filler material within each segment of the pasta shell. The formed pasta segments are passed through drying means for drying the segments. In this manner, the resulting pre-cooked pasta segments are stabilized for storage and cooking. A method is described for producing pre-cooked pasta products with the aforementioned apparatus.

BRIEF DESCRIPTION OF THE DRAWINGS

In the accompanying drawings,

FIG. 3 is a schematic drawing showing the sequence of steps involved in producing the pasta component of the invention;

FIG. 4 is a schematic drawing of a twin screw extruder showing the cooking, cooling and forming zones;

FIG. 6 is a perspective view of a section of the pre-cooked cylindrical pasta shell which contains a pre-cooked filler material as this shell is extruded from the extruder shown in FIG. 5;

FIG. 7 is a perspective view of a formed pasta segment which is representative of the pasta products that can be formed with the apparatus and method of the invention;

FIG. 11 is similar to FIG. 8, showing the rotary stamper or cutter cooperating with the belt or conveyor of FIG. 5 to compress or stamp the precooked cylindrical pasta shell and showing a pasta segment being issued at the output side of the rotary stamper or cutter, as viewed along line 11—11 in FIG. 5;

FIG. 12 is similar to FIG. 11, but showing the pre-cooked cylindrical pasta shell as it is advanced towards the inlet or input side of the rotary cutter or stamper prior to stamping or forming, as viewed along line 12—12 in FIG. 5;

FIG. 15 is a schematic side elevational view of a further embodiment of the apparatus which utilizes a pair of rotary stamping members; and FIG. 16 is a top plan view of the pair of rotary stamping members shown in FIG. 15.

DESCRIPTION OF THE PREFERRED EMBODIMENTS

The Pasta Component

In accordance with the present invention, it has been found that improved quick cooking pasta products can be prepared from a blend of dry ingredients in the presence of steam, with the possible addition of small amounts of a lubricant to produce a semi-moist blend. The semi-moist semi-cooked flour blend is then subjected to a low shear screw configuration setting in the twin screw extruder in a controlled cooking environment.

The pasta component of the present invention is precooked and can rehydrate in about 1 to about 3 minutes. It can be embellished with flavoring agents, color additives, proteins such as eggs, and other ingredients such as herbs, spices, and vegetable powder or particulates.

The method of making the pasta component of the present invention is conducted at temperatures varying from about 70° C. to 121° C. in an extrusion cooking process having reduced shear stresses. An internal lubricant is used such as monoglycerides, fats and oils, to reduce shear.

The finished pasta component texture can be controlled or designed to specific applications by regulating the formulation; the extent of cooking (partial and fully cooked); the shear stress (by screw configuration); screw speed, die shape and die opening, etc. during processing. The resulting pasta component can be rehydrated quickly in various ways, including adding it to boiling water or by adding boiling water thereto, or by microwave, thereby adding greater flexibility to the preparation of these products. The preparation time can be controlled by the extent of precooking and by the design of the co-extrusion dies, shaping rollers and cutting apparatus make products having the desired rehydration characteristics.

Figure 1:
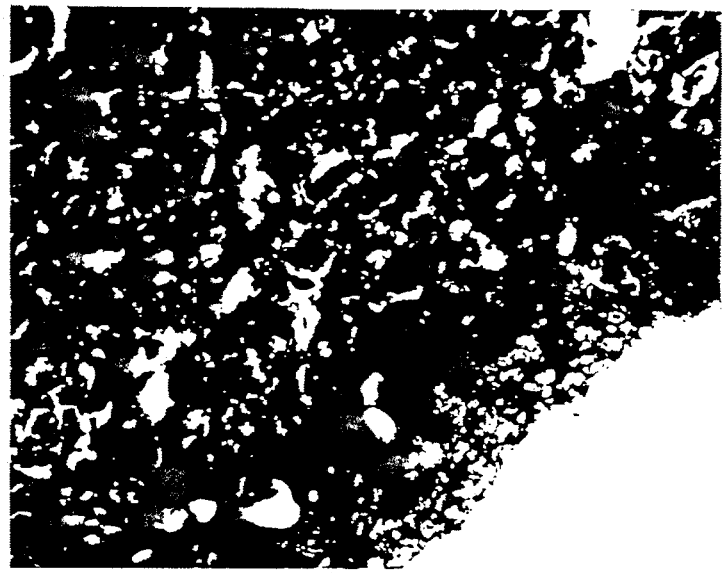
FIG. 1 is a photomicrograph of pasta produced by the extrusion method of this invention.
Figure 2:
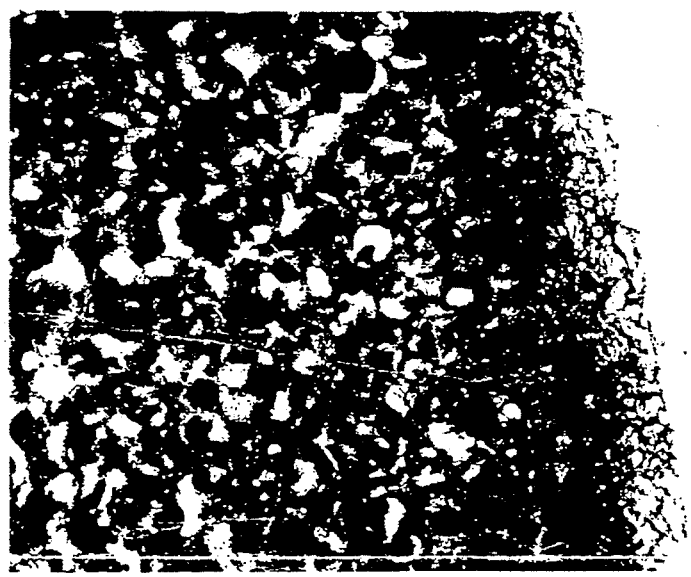
FIG. 2 is a photomicrograph of conventional pasta.

It has been found that extrusion cooking is a feasible means for producing the pasta component of the present invention. The pasta component made according to the present invention is comprised of protein within a starch matrix, in contrast to conventional pasta which is typically starch within a protein matrix. This phenomenon is illustrated by FIG. 1 which is a photomicrograph at 200× magnification showing the microstructure of pasta wherein the protein exists within a starch matrix. FIG. 2 is a photomicrograph, also at 200× magnification, and shows a microstructure of pasta produced in a conventional manner wherein the starch exists within a protein matrix.

The conventional wisdom is that starch within a protein matrix is necessary for coherency, but the present invention has demonstrated that a coherent product can be produced with protein in a starch matrix.

A twin screw extrusion cooker is desirable for producing the quick cooking pasta component of the present invention. The twin screw extruder consists of two intermeshed screws, which can vary in length up to several feet, that co-rotate within a barrel. Raw materials, such as flour, water and other ingredients are introduced into the feeder which conveys the materials into contact with the twin screws. As the twin screws rotate, the materials travel the length of the barrel. During their passage, the materials can be heated, pressurized, cooked or subjected to other operations necessary to process them into the desired product.

The shape of the screws can be varied along the length of the machine to perform different tasks, such as mixing, kneading, and cooking.

Heat can be furnished externally by heating the extruder barrel or directly by steam injection, as well as from the internal energy generated by the rotation of the screws, to cook the ingredients. At the end of the process, the material is forced through dies which form the final desired shaped product.

In preliminary tests, a twin screw extrusion cooker was equipped with a noodle die. The product produced was generally unacceptable because of the relatively high shear energy input imparted to the cooked product during extrusion.

It was found that the addition of an internal lubricant, such as glyceryl monostearate to the pasta formula before treatment, where it can be homogeneously mixed into the pasta component blend, significantly reduced the shear energy input on the screws.

It has also been found that independently injecting steam directly into the extruder barrel and/or the pre-conditioning chamber accelerated and increased the heating effect to cook the raw materials, i.e., gelatinize the starch and denature the protein.

Substances other than glyceryl monostearate were investigated as internal lubricants, such as partially hydrogenated vegetable oil, lecithin, soy oil and corn oil. The majority of these products were satisfactory as lubricants. Monoglycerides such as glyceryl monostearate was preferred because, in addition to its lubricant function in the extrusion process, it also appeared to react with the protein and starch matrix to form a complex structure that acted to reduce starch loss during cooking.

The amount of lubricant can vary from about 0.5 to about 5%, and preferably about 1 to about 2% by weight of the dry flour based blend used to produce the quick cooking pasta component. Various starch materials can be used such as durum, farina, semolina, rice flour, potato flour, bean flour, wheat flour, farina and the like including mixtures thereof, in amounts varying from about 80% to 100%, preferably about 90% to 98% by weight of the dry flour blend.

In addition to the flours employed, additives such as colorants, flavors, herbs, spices, proteins, starches, lubricants, binders and the like, are also conveniently employed.

Specific ingredients include preferred levels of disodium phosphate in amounts varying from about 0.5 to about 2% by weight and egg white in amounts varying from about 0.1 to about 3% by weight of the total blend. Various flavorings, herbs, spices, proteins, starches and coloring additives can also be included up to about 20% by weight, as needed, to enhance the taste and texture and to embellish the appearance of the food product.

Rehydration of the quick cooking pasta component varies from about 1 to about 5 minutes. The range of cooking times can be modified to achieve longer cooking times as required for the specific application.

Other flavor additives such as garlic, herb, butter and cheese flavors can also be blended into the pasta component.

In general, low to moderate precooking temperatures within the extruder of about 70° C. to about 121° C. are recommended with temperatures varying from about 85° C. to about 95° C. being preferred.

The Filling Food Component

Various filling food components can be used according to the invention. Without attempting to list all of the possibilities, examples include meats, cheeses, vegetables and various combinations thereof which can be prepared to taste with spices, flavoring agents and the like. The filling food component must be pumpable.

The following examples illustrate specific embodiments of the invention and are not intended as a limitation on the scope of the invention. All parts and percentages are by weight unless otherwise noted.

EXAMPLE 1

FIG. 3 is a process flow diagram showing the sequence of steps involved in producing quick cooking filled pasta products, with parameters and operating conditions tabulated as follows in Table 1.

TABLE

| Parameter | Conditions Overall | Preferred |
|---|---|---|
| Length/Diameter of screw | 12:1 to 36:1 | 25:1 |
| Extruder RPM (revolutions per minute) | 100-200 | 150 |
| Cooking Zone Temp., °C. | 71-121° C. | Up to 99° C. |
| Forming Zone Temp., °C. | 38-88° C. | 54-71° C. |
| Cooling Zone Pressure | 50 psig | 50 psig |
| Forming Zone Pressure | 500-1000 psig | 500-1000 psig |
| Residence time (seconds) cooking & forming | 30 to 140 | 45 |
| through mechanical shear (Kilowatt hours per pound) | 0.028 to 0.45 kwh/lb. | |
| Steam Energy input in preconditioner* and extruder** | 0.100-0.602 lbs./lb. product per minute | 0.240 lbs./lb. product per minute |
| Temperature (°C.) of water added to extrudate | 4 to 100° C. | 13-16° C. |

*Steam (30 psig)
**Steam (100 psig)

Referring to FIGS. 3 and 4, selected dry ingredients, such as semolina, durum flour, rice flours, bean flours, potato flours, colors, flavors, herbs, spices, eggs, etc. are blended together in mixer 1 These ingredients can also be added in barrel sections 14 to 30 as needed. The dry blend is then transferred to the feeder bin 2 through pneumatic conveyor system 3. A variable speed feeder screw 4 controls the blend feed into the precondition cylinder 5. Steam and water are injected into the precondition cylinder 5 where they contact and mix with the dry blend to produce a semi-moist and partially cooked raw material containing from about 15 to about 25% water.

The semi-moist raw and partially cooked raw material is fed into the twin screw extruder 6 at a controlled rate of about 400 to about 700 pounds/hour. The twin screw extruder (FIG. 4) is a co-rotating full intermesh screw with a low shear screw configuration setting 9 to prevent extensive kneading of the dough. The shear energy input preferably ranges from about 0.028 to about 0.45 kwh/lb. (0.06 to 0.1 kwh/Kg). As shown in FIG. 4, which is a top view, the twin screw extruder 6 has a cooking zone 10 and cooling zone 12, and forming zone 13.

The cooking zone 10 comprises a plurality of removable barrel sections 14, 16, 18, 20 and 22. The cooling zone 12 comprises a plurality of removable barrel sections 24 and 26. Forming zone 13 comprises a cone head section 28 and a spacer section 30. Barrel section 14 contains inlet means 32 for entry of the semi-moist and partially cooked raw material. Barrel section 16 is equipped with cold water circulating means 34. Barrel sections 18, 20 and 22 are equipped with hot externally circulating oil.

All together, barrel sections 18, 20 and 22 comprise a thermal fluid circulating zone 36. Barrel section 24 is equipped with vacuum or vent means 38 for moisture removal and cooling purposes. Barrel section 26 is externally equipped with cold water circulating means. Cone head section 28, having a tapered cross section exerts increasing pressure on the semi-moist dough raw material as it progresses through the extruder 6. Spacer section 30 extends the cooling section and makes the flow of the dough raw material more uniform and homogeneous as it enters the die 40 after which it is discharged as product.

The total residence time in the extruder is typically about 30 to 140 seconds. The length and the function of the barrel sections can be modified, or changed to meet specific product needs, such as degree and extent of cooking, cooling, mixing, etc. The formed products are discharged and may be transferred by means of pneumatic conveyor system 7 into a dryer 8, if the formed products are to be dried. However, any other convenient transfer system can be used. In the dryer 8, the formed products are dried at temperatures ranging from about 48° C. to about 80° C. for about 12 to 120 minutes, or longer, preferably about 30 to about 60 minutes, depending upon product type and shape. The food products rehydrate quickly in about 1 to about 5 minutes, or longer as needed for the specific application and have good flavor and texture characteristics.

EXAMPLE 2

A Wenger model TX-80 twin screw extrusion cooker (Wenger Manufacturing, Sabetha, Kans.) was used to assess extrusion cooking as a feasible means for producing a quick cooking pasta. Nineteen test runs were conducted using various dies to form the extruded pasta product. Test runs 1 through 3 were conducted with a short goods die having 0.030 inch thickness; test runs no. 4 through 6 were conducted with a twist die having 0.040 inch thickness, and the remaining tests were conducted with a thin-wall/ridged elbow die having 0.016 inch groove thickness and 0.020 inch ridge thickness.

The extruded pasta product was dried at 160° F. (71° C.) without humidity control for 40 minutes in a continuous dryer. Test results are shown in Table 2, which follows:

TABLE 2

| TEST NO. | FORMULA* | COOK TEMP. (°F.) | COOL TEMP. (°F.) | SHEAR ENERGY INPUT (KWH/kg) | EXTERNAL MOISTURE, % (West Basis) | COOKED PRODUCT |
|---|---|---|---|---|---|---|
| 1 | A | 157 | 158 | .130 | 23.78 | Sticky/mushy |
| 2 | A | 169 | 162 | .166 | 21.38 | Sticky/firm |
| 3 | A | — | — | .152 | 32.01 | Mushy |
| 4 | A | 109 | 117 | .152 | 32.01 | Mushy |
| 5 | A | 153 | 153 | .167 | 22.28 | Sticky/firm |
| 6 | B | 179 | 151 | .075 | 32.71 | Not sticky |
| 7 | B | 171 | 132 | .070 | 33.31 | Same/good cook tolerance |
| 8 | B | 178 | 153 | .077 | 31.71 | Firm/good cook tolerance |
| 9 | A | 175 | 148 | .086 | | Sticky/firm |
| 10 | A | 160 | 152 | .142 | 25.63 | Sticky/poor cook |

TABLE 2-continued

| TEST NO. | FORMULA* | COOK TEMP. (°F.) | COOL TEMP. (°F.) | SHEAR ENERGY INPUT (KWH/kg) | EXTERNAL MOISTURE, % (West Basis) | COOKED PRODUCT |
|---|---|---|---|---|---|---|
| | | | | | | tolerance |
| 11 | A | 152 | 151 | .161 | 26.44 | Same |
| 12 | B | 152 | 143 | .093 | 34.29 | Same |
| 13 | B | 131 | 84 | .094 | 36.56 | Same |
| 14 | C | 170 | 85 | .094 | 30.03 | Good cook tolerance |
| 15 | C | 217 | 87 | .076 | 32.03 | Same |
| 16 | C | 223 | 78 | .060 | 38.80 | Excellent cook tolerance |
| 17 | C | 158 | 79 | .060 | 41.30 | Poor cook tolerance |
| 18 | C | 165 | 81 | .068 | 33.08 | Worse than No. 17 |
| 19 | C | 216 | 81 | .066 | 38.18 | Mushy/good cook tolerance |

*Formula A: 100% semolina
Formula B: 99% semolina/1% Myvaplex ™ (Eastman Chemical's brand of glyceral monostearate)
Formula C: 98% semolina/1% Myvaplex ™ /1% egg white
Formula D: 97% semolina/1% Myvaplex ™ /1% egg white/1% salt A characteristic of the extruded products was that they were comprised of protein within a starch matrix, as compared to starch within a protein matrix, which is typical of conventional pasta.

All product produced from tests 1 through 5 was generally unacceptable, primarily due to the relatively high shear energy input imparted to the cooked product during extrusion with a Wenger model TX-80 extrusion cooker, on the order of about 0.130 to 0.167 kilowatt hours/kilogram (kwh/Kg).

A 1% glyceryl monostearate (MYVAPLEX TM Eastman Chemical, Kingsport, Tenn.) addition to the formula acted as an internal lubricant to reduce shear energy input. Steam was also injected directly into the extruder barrel and preconditioner to provide heat and noisture to minimize the dough viscosity and minimize shear energy input.

Test runs 6 through 8 were conducted with the glyceryl monostearate lubricant and resulted in a significant reduction in shear energy input, on the order of 0.070 to 0.077 kwh/Kg, a generally acceptable product for the conditions tested.

Test runs 9 through 11 were conducted with 100% semolina (without glyceryl monostearate) to assess the relative extent to which direct steam injection lowered shear energy input. The results showed a reduction of from 0.142-0.161 kwh/Kg (test nos. 10 and 11, respectively) to 0.086 kwh/Kg (test no. 9), or a reduction of approximately 40% in shear energy input due to the dough's rheological property change by the hot steam injection. All products were generally unacceptable. However, the test no. 9 product, with steam injection, was noticeably firmer than that corresponding to test nos. 10 and 11, having no steam injection, which exhibited poor cook tolerance.

Test runs 12 and 13 were conducted with the 1% glyceryl monostearate formula, without steam injection, to determine the relative extent to which the glyceryl monostearate lowered shear energy input. Again, the results showed a reduction of approximately 40% to about 0.094 kwh/Kg. The product produced exhibited stickiness and poor cook tolerance, and was roughly comparable to that produced in test runs 10 and 11.

It was found that both direct steam injection and the inclusion of glyceryl monostearate lubricant were required to produce acceptable product as demonstrated in test runs 6 through 8.

Test runs 14 through 17 were conducted with formula C containing 98% semolina, 1% glyceryl monostearate and 1% egg white with a different screw configuration to reduce shear in the extruder, and direct steam injection to the extruder barrel. The process conditions corresponding to test runs 14 and 16 produced product that was acceptable in that it was not sticky, and had good to excellent cook tolerance.

The product from test runs 15 and 16 was similar to conventional pasta. Test run 17 resulted in product that was generally unacceptable, due to the exposure of cooling water on the heater section of the extruder barrel, resulting in a temperature that was too low to fully cook the dough.

Test runs 18 (with cooling water) and 19 (without cooling water) were run with formula D containing 97% semolina, 1% glyceryl monostearate, 1% egg white and 1% salt, with and without cooling water on the heating sections of the extruder barrel, to assess the effect of this process difference and direct steam injection. Test run 18 (with cooling water) resulted in a product with poor cook tolerance that was worse than test run 17. Test run 19 (without cooling water), in contrast, resulted in a product that was generally acceptable, indicating that cooling water on the heating sections of the extruder barrel had a significant negative impact on the overall product quality. It was noted that formula D produced a significant reduction in the time required to rehydrate the finished product, most likely due to the salt content. Thus, previously produced products using the elbow die required roughly 3 minutes to rehydrate, whereas the product with 1% salt required only 2 minutes or less.

EXAMPLE 3

A series of 27 runs were made using a Wenger model TX-80 twin screw extrusion cooker using the procedure of Example 1. These runs were used to produce rice granules from rice flour using a rice shaped die to form extruded products which were subsequently dried for 12 minutes at 210° F. Table 3, which follows, tabulates the weight percent (%) of ingredients in addition to the rice flour, and provides observations of the product properties. All product samples rehydrated in boiling water within 5 minutes.

TABLE 3

| TEST NO. | % DSP | % GLYCERYL MONOSTEARATE | % EGG WHITE | % SALT | OBSERVATIONS - EXTRUDED PRODUCT |
| --- | --- | --- | --- | --- | --- |
| 1 | 1.5 | 1.0 | 1.0 | 1.5 | Forms very well |
| 2 | 1.5 | 1.0 | 2.0 | 0.0 | Forms very well |
| 3 | 3.0 | 2.0 | 1.0 | 1.5 | Forms very well, product yellowish |
| 4 | 1.5 | 1.0 | 0.0 | 3.0 | Forms very well |
| 5 | 0.0 | 0.0 | 1.0 | 1.5 | Very sticky/clumping together |
| 6 | 3.0 | 0.0 | 1.0 | 1.5 | Marked clumping/sticky |
| 7 | 1.5 | 1.0 | 0.0 | 0.0 | Forms very well |
| 8 | 2.0 | 0.0 | 1.0 | 1.5 | Very sticky/clumping together |
| 9 | 1.5 | 1.0 | 2.0 | 3.0 | Forms very well |
| 10 | 3.0 | 1.0 | 1.0 | 0.0 | Forms very well |
| 11 | 1.5 | 2.0 | 2.0 | 1.5 | Forms very well |
| 12 | 1.5 | 2.0 | 0.0 | 1.5 | Forms very well |
| 13 | 1.5 | 0.0 | 2.0 | 1.5 | Very sticky/clumping together |
| 14 | 0.0 | 1.0 | 1.0 | 3.0 | Forms very well |
| 15 | 1.5 | 1.0 | 1.0 | 1.5 | Forms very well |
| 16 | 1.5 | 0.0 | 0.0 | 1.5 | Very sticky/clumping together |
| 17 | 0.0 | 1.0 | 1.0 | 0.0 | Forms very well |
| 18 | 3.0 | 1.0 | 1.0 | 3.0 | Forms very well |
| 19 | 1.5 | 1.0 | 0.0 | 3.0 | Forms very well |
| 20 | 1.5 | 0.0 | 1.0 | 0.0 | Minor clumping/sticky |
| 21 | 1.5 | 2.0 | 1.0 | 0.0 | Forms very well |
| 22 | 3.0 | 1.0 | 2.0 | 1.5 | Forms very well |
| 23 | 1.5 | 2.0 | 1.0 | 3.0 | Forms very well |
| 24 | 1.5 | 1.0 | 1.0 | 1.5 | Forms very well |
| 25 | 0.0 | 1.0 | 2.0 | 1.5 | Forms very well |
| 26 | 0.0 | 1.0 | 0.0 | 1.5 | Forms very well |
| 27 | 3.0 | 1.0 | 0.0 | 1.5 | Forms very well |

EXAMPLE 4

A series of runs were made using a Wenger model TX-80 twin-screw extrusion cooker having a configuration similar to that of FIG. 4 to produce fast rehydrating bean food products. The processing parameters were the same as listed in Table 1. Table 4, which follows, summarizes the formula variation, processing modifications and product evaluation. Test Nos. 1 to 4 showed that pre-cooked bean flours with and without MYVAPLEX TM (1% or 2%) and DSP (disodium phosphate) in the formula produced bean products that were gummy, stuck to the teeth, and separated during cooking. Test Nos. 5 and 6 used uncooked bean flours instead of the precooked bean flours. Product evaluation indicated that the gummy texture of beans was reduced by utilizing uncooked bean flours, but poor cooking tolerance (separation and layer structure) still occurred. A processing modification involving removing the spacer between the cone head and the die of the extrusion cooker and using uncooked bean flours was introduced in Test Nos. 7 and 8. Product evaluation indicated that the bean products had good eating texture, and good cooking tolerance.

The Apparatus For Producing Pre-Cooked Pasta

Figure 5:
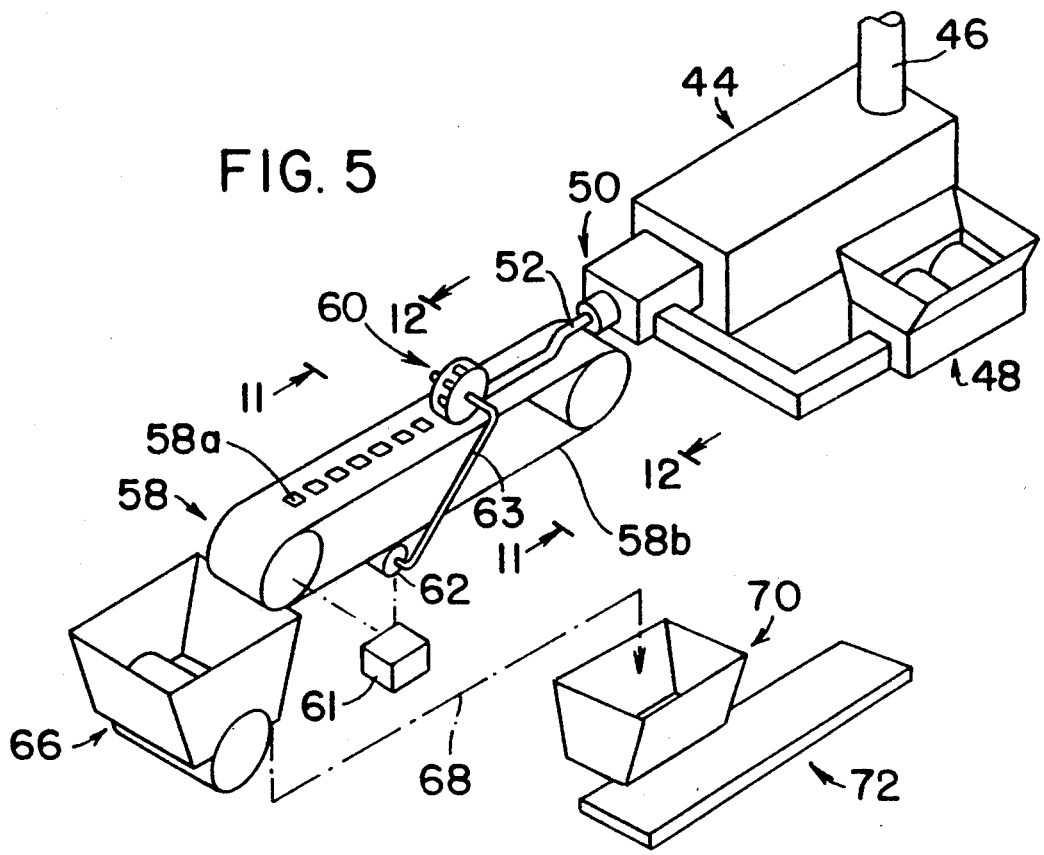
FIG. 5 is a perspective view of an apparatus for producing pre-cooked pasta products in accordance with the present invention.

Referring to FIG. 5, one embodiment of an apparatus is shown for producing pre-cooked pasta products in accordance with the present invention. The apparatus is generally designated by the reference numeral 42.

TABLE 4

| TEST NO. | FORMULA | CONDITION | EVALUATION |
| --- | --- | --- | --- |
| 1 | 100% pre-cooked bean flour | with spacer | Gummy texture/poor cook tolerance |
| 2 | 99% pre-cooked bean flour + 1% Myvaplex TM | with spacer | Gummy texture/poor cook tolerance |
| 3 | 98% pre-cooked bean flour + 2% Myvaplex TM | with spacer | Gummy texture/poor cook tolerance |
| 4 | 98% pre-cooked bean flour + 1% Myvaplex TM + 1% DSP | with spacer | Gummy texture/poor cook tolerance |
| 5 | 99% uncooked bean flour + 1% Myvaplex TM | with spacer | Not gummy/poor cook tolerance |
| 6 | 99% uncooked bean flour + 2% Myvaplex TM | with spacer | Not gummy/poor cook tolerance |
| 7 | 99% uncooked bean flour + 1% Myvaplex TM | without spacer | Good texture/cook tolerance |
| 8 | 98% uncooked bean flour + 2% Myvaplex TM | without spacer | Good texture/cook tolerance |

The apparatus 42 includes a co-extruder 44. The specific construction of the co-extruder is not critical, although it should include a zone for cooking the pasta to a desired temperature and consistency. The co-extruder 44 may be the aforementioned Wenger model TX-80 or any other similar extruder. The extruder 44 is connected to pre-conditioning cylinders through inlet conduit 46 which introduces the pasta materials into the extruder. A filling hopper 48 is provided with a suitable pump for feeding the filling material under pressure into a die assembly 50. The co-extrusion die may be, for example, of the type disclosed in the U.S. Pat. No. 4,579,744 issued to Thulin et al.

An important feature of the invention is the use of a die assembly 50 which issues a pre-cooked or mostly pre-cooked pasta shell which contains pre-cooked filler material, suitable means can be used to adjust the extruded product temperature in to in excess of about 60° C. upon extrusion.

The extruder thus produces an elongate pre-cooked cylindrical pasta shell 52, a detail of which is shown in FIG. 6. The pasta shell 52 includes a moldable outer pasta shell or wrap 54 which contains a filling 56 therein. The pasta shell 52 shown in FIG. 6 is not shown to scale and it will be evident that the thickness of the outer wrap 54 may vary in relation to the inner diameter of the shell which defines the volume for the filling material 56. Also, while FIG. 6 shows the filling material to totally fill the inside volume of the outer wrap 54, it will also be evident that this is not critical and it is possible and even likely that in many applications the volume inside the outer wrap will not be totally filled but will contain filling material as well as air spaces. This can be controlled by the pumping pressures for the filling material. In many cases, the pressure applied to the filling material may desirably be limited to avoid forces which would tend to undesirably expand the outer wrap upon extrusion. Additionally, while the cylindrical pasta shell is shown to have a circular cross-section, it will also be evident to those skilled in the art that the cylindrical pasta shell can assume any cross-sectional configuration, including square, rectangular, etc. The pumping pressures as well as the specific shape and dimensions of the extruded pasta shell are all parameters which can be adjusted by those skilled in the art to obtain a specific product.

Again referring to FIG. 5, the extruded pasta shell 52 is deposited on a conveyor belt 58 which has an upper portion 58a arranged to move downstream relative to the die assembly 50, and a lower conveyor portion 58b which returns upstream relative to the die assembly. In the embodiment shown in FIG. 5, a rotary stamper or cutter disc 60 is provided, the rotation of which is synchronized by a synchronizing device 61 with the movement of the conveyor belt 58 so that the peripheral surfaces of the rotary stamper or cutter 60 is substantially equal to the linear velocity of the conveyor belt portion 58a. The synchronizing device may be electrical or mechanical to control the motor 62 which drives the rotary stamper or cutter 60 by means of a belt or chain 63.

The rotary stamper or cutter 60 serves to receive and partition the cylindrical pasta shell 52 into pasta segments 64 each having axial ends and shaping each segment to have a predetermined configuration and sealing the axial ends to capture and retain the filler material 56 within each segment of the pasta shell. The specific details of the rotary stamper or cutter 60 will be more specifically described in connection with FIGS. 8-10.

The formed or stamped pasta segments 64 are advanced along a predetermined path from the die assembly 50 to an inlet receiving bin 66 from which they can be transported by conveyor 68 or by pneumatic transfer to an outlet bin 70 which feeds the pasta segments to a drier 72. The drier may be, for example, a two pass drier for stabilizing the pre-cooked pasta segments for storage and cooking.

Figure 8:
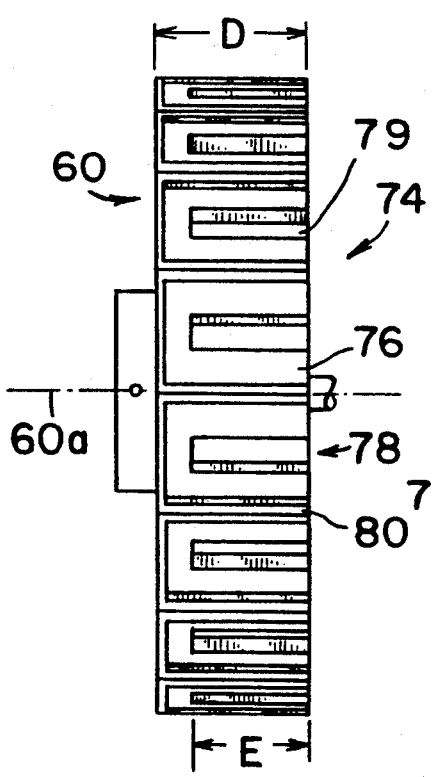
FIG. 8 is a front elevational view of a rotary stamper or cutter which forms a part of the apparatus shown in FIG. 1.
Figure 9:
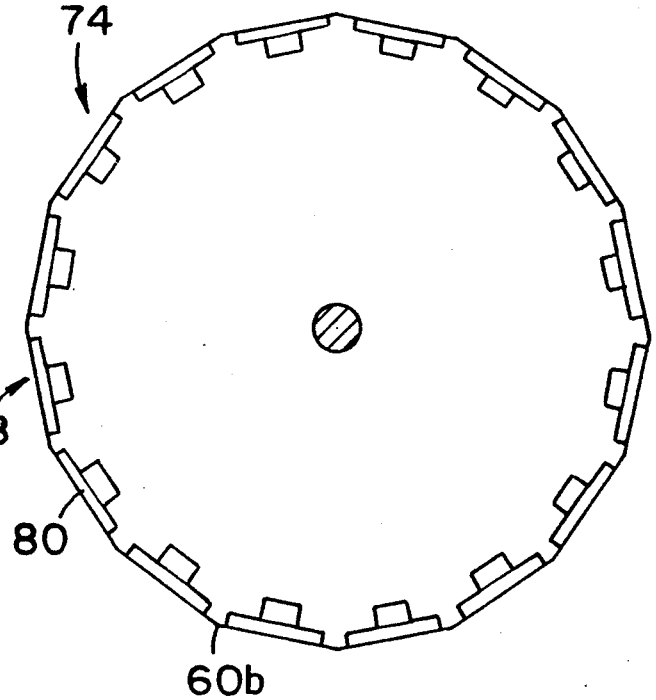
FIG. 9 is a side elevational view of the rotary stamper or cutter shown in FIG. 8.
Figure 10:
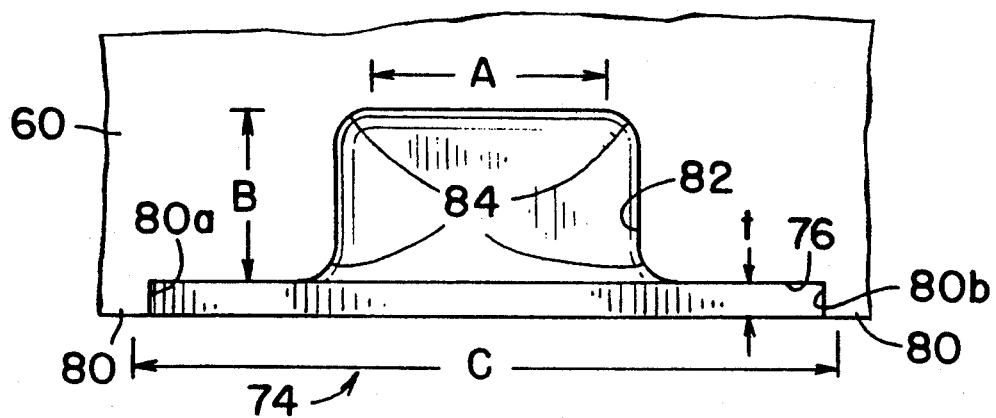
FIG. 10 illustrates the details of one of the cavities or pockets formed on the edge or peripheral surface of the rotary cutter or stamper shown in FIGS. 8 and 9.

Referring to FIGS. 8-10, details of the rotary stamper or cutter are shown. The rotary stamper or cutter 60 is mounted on a shaft which is suitably supported for rotation as shown in FIG. 5 about an axis of rotation 60a which is substantially parallel to the plane of the upper conveyor portion 58a and substantially normal to the length direction of the path defined by the conveyor. The rotary stamper or cutter 60 defines a surface 60b about its circumferential periphery. The diameter of the rotary stamper or cutter 60 as well as the position of the axis 60a are selected so that the peripheral surface 60b moves proximate to the upper conveyor portion 58a. The peripheral surface 60b is divided into a plurality of stamping surfaces or facets 74 which are contiguous as shown, each of the facets defining stamping surfaces which are substantially normal to the radial direction of the rotary stamper or cutter 60. While the sizes and specific configurations of the stamping or cutting facets are not critical, a specific configuration will be described as an example of one pasta product that can be formed. It will be understood, however, that different stamping or cutting facets can be used, as will be evident to those skilled in the art, in order to achieve pastas having different sizes and shapes.

Since the cutting facets on a single rotary stamper or cutter 60 will normally all be identical, only one stamping or cutting surface or facet 74 will be described in detail. Each stamping or cutting facet 74 includes a substantially flat peripheral surface 76 which forms a portion of the peripheral surface 60b of the rotary stamper or cutter. The flat surface 76 is formed with a cavity 78 which is configurated to correspond to the desired shape of the pasta product. In the presently preferred embodiment, the flat surface 76 as well as the recessed cavity 78 are closed at one axial end (on the left as shown in FIG. 8) and open at the opposite axial end (at 79). Raised edges 80 are provided which project radially outwardly and extend about each of the flat peripheral surfaces 76. However, the cutters include at least transverse cutting edges 80 each separating another pair of adjacent stamping facets 74 and having a height substantially equal to a predetermined distance equal to the spacing or separation of the flat peripheral surfaces 76 from the upper conveyor portion 58a. In this manner, the cutting edges 80 can substantially abut against the upper conveyor portion 58a to substantially sever adjacent pasta segments 64 from each other.

Particularly referring to FIG. 10, the details of a single cavity or pocket on the rotary stamper or cutter are shown. To facilitate a description of the process, the arrow in FIG. 10 indicates the direction of movement of the stamping or cutting facet during rotation of the rotary stamper or cutter. With reference to the direction of movement shown, the stamping or cutting facet 74 has a leading cutter edge 80a and a trailing cutter edge 80b. The dimensions A, B and C represent dimensions of the cavity or pocket. In the embodiment being described, the dimension A is equal to 0.37 inches, the dimension B is 0.30 inches and the dimension C is equal to 1.38 inches. Referring to FIG. 8, the dimension D is 1.25 inches, while the dimension E is 1.0 inch. The dimension t represents the height of the cutters 80 and is substantially equal to the predetermined distance that the flat peripheral surfaces 76 are spaced from the upper conveyor portion 58a so that the cutters abut against or move into close proximity with the upper conveyor portion 58a to cut or sever the pasta shell 52.

The interior of the cavity 78 is advantageously coated with a release agent, such as silverstone or any other coating 82 which facilitates the release of the stamped pasta products and prevents them from sticking and being retained within the cavities after the stamping has taken place.

Referring to FIGS. 11 and 12, the rotary cutters or stamper 60 are illustrated cooperating with the upper conveyor portion 58a to stamp the elongated precooked cylindrical pasta shell or ribbon 52. FIG. 11 is a view of the rotary stamper or cutter 60 along the length direction of the conveyor 58 from the downstream end thereof, while FIG. 12 is a similar view from the upstream end. It will be observed that in FIG. 12 the elongate pre-cooked cylindrical pasta shell is advanced towards the rotary cutter or stamper 60 at an inlet side thereof while a pasta segment or food capsule 64 is issued at the outlet side thereof (FIG. 11). In FIGS. 11 and 12, the upper surface of the upper conveyor portion 58a is shown to define a stamping plane S which provides the supporting or cooperating surface against which the co-extruded pre-cooked pasta shell is pressed or stamped by the rotary cutter or stamper 60.

While the stamping plane S is shown to be substantially flat and horizontal, this is not critical. The stamping surface S may assume other configurations and may be provided with complimentary stamping surfaces to provide different shapes of the finished product.

Figure 13:
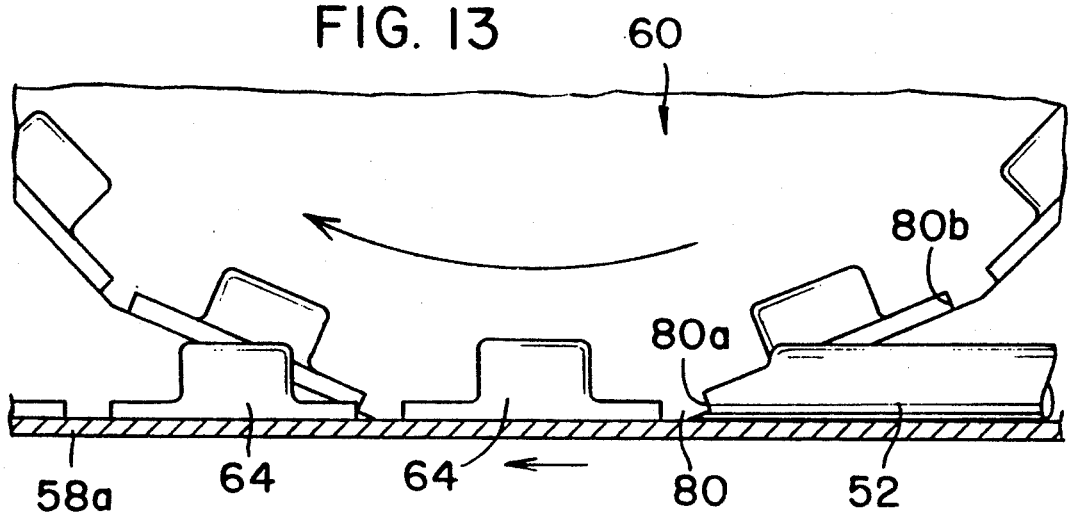
FIG. 13 is an enlarged fragmented view of the rotary stamper or cutter illustrating how the pasta segments are formed.
Figure 14:
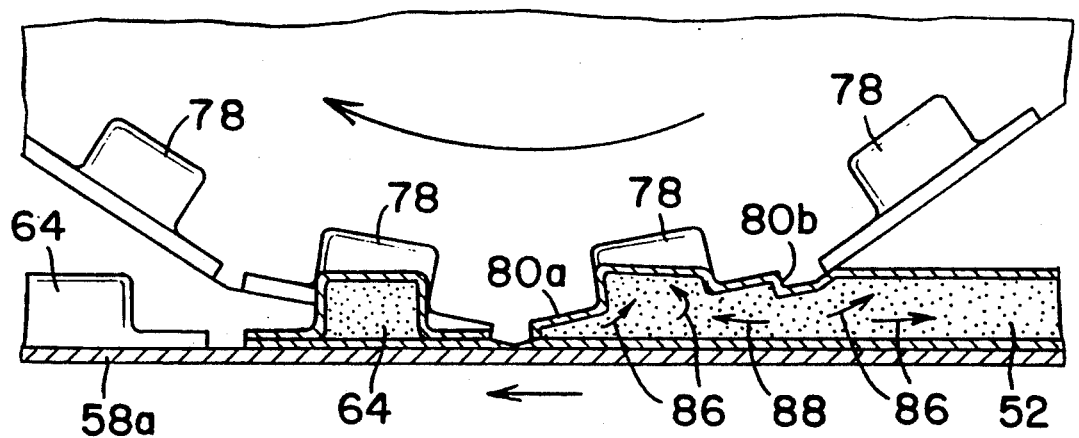
FIG. 14 is similar to FIG. 13, but illustrating the flow of the filler material during the stamping or forming step.

Referring to FIGS. 13 and 14, the process of forming the pasta product is illustrated. As the pre-cooked cylindrical pasta shell 52 is advanced towards the rotary cutter or stamper 60, a leading portion thereof is initially pressed downwardly by the leading cutter edge 80a. Continued compression of the shell by the leading flat peripheral surface 76 urges the filling material to be forced into a centrallly located recessed cavity or pocket 78, as suggested by the arrows 86. This is repeated as the trailing cutter edge 80b starts to compress the cylindrical pasta shell and, again, filling material in the region of the trailing cutting edge 80b is forced to move into the cavity or pocket 78, this time moving downstream as suggested by the arrow 88. Of course, the edge immediately adjacent the trailing cutter edge 80b of one pasta segment becomes the leading cutting edge of the next successive pasta segment, and the filling for the next successive pasta segment is likewise shifted in the upstream direction, as suggested by the arrow 86.

Preferably, the dimensions of the flat peripheral surfaces 76 and the dimensions of the cavities or pockets 78 are selected so that each pasta shell segment represents a volume which is substantially equal to the volume defined between each two successive cutters 80. In this manner, once the pasta segment has been stamped and fully formed, it will substantially fill the entire space defined between each two successive cutters 80. However, in the described embodiment the cavities or pockets are open at 79 to allow for some expansion in the event that the volume of the pasta segment is slightly greater than the volume between each two successive cutters 80. Referring to FIG. 7, one pasta product configuration is illustrated, using the described rotary stamper or cutter. Thus, the upper portion 64a represents that portion which is formed within the cavity or pocket 78, while the flat portions 64b-64d represent the flat peripheral portions of the pasta segment compressed by the flat peripheral surface 76 on the cutter or stamper. Since the pre-cooked cylindrical pasta shell 52 is closed about its periphery and only open at its axial ends, it will be appreciated that the axial ends must be sealed whereby the upper cylindrical half of the outer wrap 54 is compressed against the lower half of the cylindrical outer wrap, these being flattened by the flat peripheral surface 76 during which filling material between the flattened portions 64e and 64f are displaced by pressure into the central region 64a. Once the filling material has been displaced, the upper and lower halves of the pasta shell or wrap 54 are pressed against each other. By maintaining the temperature of the pasta shell above about 70° C. upon extrusion and during the stamping or cutting step, it has been found that the pre-cooked dough fuses to provide a reliable seal or bond, insuring that the filling material is captured and retained within each pasta segment.

Referring to FIGS. 15 and 16, an alternate embodiment is illustrated for achieving substantially the same objectives or advantages. Instead of a rotary stamper or cutter mounted proximate to a linear conveyor belt, the embodiment 90 of these figures illustrates a pair of rotary stampers or cutters 92a and 92b. With the exception of the replacement of the conveyor belt with the rotary element 92a, the operation of the embodiment is identical to the one previously described. In this second embodiment, the pair of rotary stampers or cutters 92a and 92b are mounted on respective shafts 94, 96 which are parallel to each other and the discs 92a, 92b are arranged in a common plane. While the rotary stamper or cutter 92b may be configured identically to the rotary stamper or cutter 60, the rotary cutter or stamper 92a is provided with a series of contiguous flat surfaces 98 each arranged to come into proximity and oppose an associated flat peripheral surface on the rotary cutter or stamper 92b. The shafts 94, 96 are driven in synchronism so that the cylindrical pasta shell 52 experiences the same stamping or pressing action as with the rotary stamper or cutter 60 and the conveyor belt 58. If desired, edge guide flanges 100 may be provided to limit the degree of expansion in the axial direction upon compression and help guide the tube into the cutting section.

While the invention herein has been described in terms of preferred embodiments, it will be recognized by those skilled in the art that the invention as covered by the claims that follow can be modified to suit the needs of a particular application, and that certain novel features of the invention ca be used without a corresponding use of the other features.

We claim:

1. Apparatus for producing pre-cooked pasta products comprising:
    extruding means for extruding an elongate pre-cooked cylindrical pasta shell which contains a pre-cooked filler material;
    advancing means for advancing the extruded pasta shell from said extruding means along a predetermined path;
    stamping means for partitioning the cylindrical pasta shell into pasta segments each having axial ends and shaping each segment to have a predetermined configuration and sealing the axial ends to capture and retain the filler material within each segment of the pasta shell; and
    drying means downstream of said stamping means along said predetermined path for drying the segments, whereby the resulting pre-cooked pasta segments are stabilized for storage and cooking.

2. Apparatus as defined in claim 1, wherein said extruding means comprises a co-extruder.

3. Apparatus as defined in claim 1, wherein said extruding means includes heating means for heating the dough to a temperature in excess of about 70° C. upon extrusion.

4. Apparatus as defined in claim 1, wherein said advancing means comprises a conveyor extending at least from said extruding means to the location of said stamping means along said predetermined path.

5. Apparatus as defined in claim 4, wherein said conveyor includes an upper conveyor portion for carrying the extruded pasta shell within stamping plane; a rotary stamper disc having a peripheral surface which moves proximate to said upper conveyor portion, said peripheral surface being formed with stamping cavities configurated to correspond to the desired shape of the pasta product; and synchronization means for substantially synchronizing the surface velocities of said upper conveyor portion and said peripheral surface.

6. Apparatus as defined in claim 1, wherein said advancing means comprises a conveyor including a conveyor portion defining a supporting surface for carrying the extruded pasta shell.

7. Apparatus as defined in claim 6, wherein said supporting surface is substantially flat.

8. Apparatus as defined in claim 7, wherein said supporting surface is substantially horizontal.

9. Apparatus as defined in claim 7, wherein said stamping means comprises a rotary stamper disc mounted about an axis for rotation in a plane substantially normal to said supporting surface and having a peripheral surface formed with a plurality of stamping facets which segmentially stamp successive segments of the pre-cooked cylindrical shell.

10. Apparatus as defined in claim 9, wherein each facet of said rotary stamper disc includes a recessed cavity for receiving the filler material and a portion of the pasta shell and a substantially flat peripheral surface at least partially surrounding said recessed cavity, said rotary stamper disc being spaced from said supporting surface a predetermined distance, whereby movement of a stamping facet proximate to said supporting surface causes said peripheral surface to press the pasta shell against said supporting surface thereby forcing the filling material into a central region of said recessed cavity and forming a substantially flat peripheral portion about the pasta product.

11. Apparatus as defined in claim 10, wherein said stamper disc has a predetermined width along the axial direction, the recessed cavity of each stamping facet being open at one axial end of the disc to allow for expansion without rupturing of the pasta shell during stamping.

12. Apparatus as defined in claim 10, further comprising transverse cutting edges each separating another pair of adjacent stamping facets and having a height substantially equal to said predetermined distance, whereby said cutting edges substantially abut against said supporting surface to substantially sever adjacent pasta segments from each other.

13. Apparatus as defined in claim 10, wherein said recessed cavity is formed by surfaces which meet at rounded edges.

14. Apparatus as defined in claim 10, wherein said stamping facets are coated with a release agent.

15. Apparatus for producing pre cooked pasta comprising:
extruding means for extruding an elongate pre-cooked cylindrical pasta shell which contains a pre-cooked filler material;
stamping means for receiving and partitioning the cylindrical pasta shell into pasta segments each having axial ends and shaping each segment to have a predetermined configuration and sealing the axial ends to capture and retain the filler material within each segment of the pasta shell; and
drying means for drying the stamped pasta segments.

16. Apparatus as defined in claim 15, wherein said stamping means comprises dual rotary stamper discs arranged in a common plane and having stamping surface facets; and
driving means for rotating said dual rotary cutters in synchronism to bring successive pairs of cooperating stamping surface facets into registry with each other.

17. Apparatus as defined in claim 16, wherein at least one of the stamping surface facets of each pair is provided with a central recessed cavity for receiving the filler material and a portion of the pasta shell and a substantially flat peripheral surface at least partially surrounding said recessed cavity.

18. Apparatus as defined in claim 17, wherein said rotary stamper discs have a predetermined width along the axial direction, the recessed cavity of each stamping facet being open at one axial end of the disc to allow for expansion without rupturing of the pasta shell during stamping.

19. Apparatus as defined in claim 17, wherein the stamping surface facets of one rotary stamper disc is provided with a recessed cavity and the other associated stamping surface of the other rotary stamper disc is provided with a flat stamping surface.

20. Apparatus as defined in claim 15 further including an advancing means for advancing the extruded pasta shell from said extruding means along a predetermined path.

* * * * *